United States Patent
Park et al.

(10) Patent No.: US 11,032,115 B2
(45) Date of Patent: Jun. 8, 2021

(54) DEVICE AND METHOD FOR DECODING BOOTSTRAP SIGNAL

(71) Applicants: ELECTRONICS AND TELECOMMUNICATIONS RESEARCH INSTITUTE, Daejeon (KR); KOREA MARITIME UNIVERSITY INDUSTRY—ACADEMIC COOPERATION FOUNDATION, Busan (KR)

(72) Inventors: Sung-Ik Park, Daejeon (KR); Jeong-Chang Kim, Busan (KR); Jae-Young Lee, Daejeon (KR); Sun-Hyoung Kwon, Daejeon (KR); Hyeong-Seok Kim, Jeju-si (KR); Heung-Mook Kim, Daejeon (KR); Nam-Ho Hur, Sejong (KR)

(73) Assignees: Electronics and Telecommunications Research Institute, Daejeon (KR); Korea Maritime University Industry-Academic Cooperation Foundation, Busan (KR)

( * ) Notice: Subject to any disclaimer, the term of this patent is extended or adjusted under 35 U.S.C. 154(b) by 0 days.

(21) Appl. No.: 16/652,428

(22) PCT Filed: May 24, 2018

(86) PCT No.: PCT/KR2018/005891
§ 371 (c)(1),
(2) Date: Mar. 31, 2020

(87) PCT Pub. No.: WO2019/074183
PCT Pub. Date: Apr. 18, 2019

(65) Prior Publication Data
US 2020/0235976 A1 Jul. 23, 2020

(30) Foreign Application Priority Data

Oct. 11, 2017 (KR) .................. 10-2017-0130140

(51) Int. Cl.
*H04L 27/26* (2006.01)
*H04L 1/00* (2006.01)
*H04L 25/02* (2006.01)

(52) U.S. Cl.
CPC ........ *H04L 27/2613* (2013.01); *H04L 1/0071* (2013.01); *H04L 25/0204* (2013.01); *H04L 27/2607* (2013.01); *H04L 27/2628* (2013.01)

(58) Field of Classification Search
CPC .............. H04L 27/2613; H04L 1/0071; H04L 27/2695; H04L 27/2607; H04L 27/2628
(Continued)

(56) References Cited

U.S. PATENT DOCUMENTS

2002/0159532 A1* 10/2002 Wight .................. H04B 1/68
375/260
2009/0252254 A1* 10/2009 Kim .................. H04L 25/03159
375/295

(Continued)

FOREIGN PATENT DOCUMENTS

KR 10-2017-0080495 A 7/2017
WO WO 2017/137731 A1 8/2017

OTHER PUBLICATIONS

Kim, Jeongchang et al., "Study on Synchronization Using Bootstrap Signals for ATSC 3.0 Systems", *The Korean Institute of Broadcast and Media Engineers*, vol. 21, Issue 6, 2016 (pp. 899-912).
(Continued)

*Primary Examiner* — Emmanuel Bayard
(74) *Attorney, Agent, or Firm* — NSIP Law (57) ABSTRACT

Disclosed herein are an apparatus and method for decoding a bootstrap signal. The apparatus for decoding a bootstrap
(Continued)

signal according to an embodiment of the present invention includes an operation unit for calculating the relative cyclic shift and the channel gain estimate of a received bootstrap signal and correcting the channel gain estimate using the relative cyclic shift, and a decoding unit for decoding the bootstrap signal using the corrected channel gain estimate.

20 Claims, 3 Drawing Sheets

(58) Field of Classification Search
USPC .................................. 375/260, 316, 340, 341
See application file for complete search history.

(56) References Cited

U.S. PATENT DOCUMENTS

| | | | |
|---|---|---|---|
| 2011/0134968 A1* | 6/2011 | Han | H04L 5/0023 375/146 |
| 2011/0170489 A1* | 7/2011 | Han | H04B 7/068 370/328 |
| 2011/0317640 A1* | 12/2011 | Kawamura | H04L 5/0048 370/329 |
| 2013/0177112 A1* | 7/2013 | Lan | H03G 3/3078 375/345 |
| 2016/0269980 A1* | 9/2016 | Simon | H04L 27/2663 |
| 2017/0006070 A1 | 1/2017 | Lee et al. | |
| 2017/0026152 A1* | 1/2017 | Atungsiri | H04L 27/22 |
| 2017/0026220 A1* | 1/2017 | Atungsiri | H04L 27/2666 |
| 2017/0237591 A1* | 8/2017 | Atungsiri | H04L 27/3488 375/260 |
| 2018/0062820 A1* | 3/2018 | Simon | H04L 5/0083 |
| 2018/0359045 A1 | 12/2018 | Park et al. | |

OTHER PUBLICATIONS

Kim, Hyeongseok et al., "Improved Decoding Algorithm of Bootstrap Signals for ATSC 3.0 Systems", *2017 IEEE International Symposium on Broadband Multimedia Systems and Broadcasting (BMSB)*, 2017 (4 pages in English).

International Search Report dated Feb. 22, 2019 in counterpart International Patent Application No. PCT/KR2018/005891 (2 pages in English and 2 pages in Korean).

* cited by examiner

DEVICE AND METHOD FOR DECODING BOOTSTRAP SIGNAL

CROSS REFERENCE TO RELATED APPLICATIONS

This application is a U.S. National Stage Application of International Application No. PCT/KR2018/005891, filed on May 24, 2018, which claims the benefit under 35 USC 119(a) and 365(b) of Korean Patent Application No. 10-2017-0130140, filed on Oct. 11, 2017, in the Korean Intellectual Property Office, the entire disclosure of which is incorporated herein by reference for all purposes.

TECHNICAL FIELD

The present invention relates generally to broadcast and communications technology, and more particularly, to technology for more accurately decoding a received bootstrap signal.

BACKGROUND ART

In the frame of a broadcast signal, a bootstrap is placed at the head of the frame and provides the entry point thereof. Also, the bootstrap includes signaling information that is necessary in order to decode a preamble. The bootstrap signal may be configured with multiple symbols. For example, the first symbol may be used to estimate the initial synchronization time of the frame, a frequency offset, and a channel. The remaining symbols may include signaling information that is required for decoding a preamble.

A bootstrap signal is generated by multiplying a Zadoff-Chu sequence by a pseudo-noise (PN) sequence. Here, the root of the Zadoff-Chu sequence represents the major version of the bootstrap signal, and the seed of the PN sequence represents the minor version thereof. The generated sequence is mapped to 1498 subcarriers based on a DC subcarrier. The mapped signal in the frequency domain is transformed into a signal in the time domain through Inverse Fast Fourier Transform (IFFT).

For example, the signaling information required for decoding the preamble may be represented as the cyclic shift of remaining symbols, excluding the first bootstrap symbol, in the time domain. The cyclic shift may include a relative cyclic shift and an absolute cyclic shift. The relative cyclic shift represents the cyclic shift for the current symbol relative to the cyclic shift for the previous symbol, and the signaling information may be represented as the relative cyclic shift. The absolute cyclic shift represents the cyclic shift for the current symbol relative to the first symbol, and the signals cyclically shifted through the absolute cyclic shift may be finally transmitted.

Meanwhile, Korean Patent Application Publication No. 10-2017-0080495, titled "Apparatus for transmitting broadcast signal using transmitter identification and method using the same", discloses an apparatus and method for transmitting broadcast signals in which a transmitter is identified using a transmitter identification (TxID) signal in a broadcast system.

DISCLOSURE

Technical Problem

The present invention intends to provide maximum-likelihood decoding in order to decode a bootstrap signal.

Also, the present invention intends to improve the accuracy of a channel gain estimate, which is necessary for maximum-likelihood decoding.

Also, the present invention intends to provide accurate decoding of a bootstrap signal by performing iterative maximum-likelihood decoding using a more accurate channel gain estimate.

Technical Solution

In order to accomplish the above objects, an apparatus for decoding a bootstrap signal according to an embodiment of the present invention includes an operation unit for calculating the relative cyclic shift and the channel gain estimate of a received bootstrap signal and correcting the channel gain estimate using the relative cyclic shift, and a decoding unit for decoding the bootstrap signal using the corrected channel gain estimate.

Here, the operation unit may calculate the relative cyclic shift using the absolute cyclic shifts of two successive symbols in the bootstrap signal.

Here, the operation unit may calculate the relative cyclic shift depending on the condition in which the channel gain values of the two successive symbols in the bootstrap signal are equivalent to each other.

Here, the operation unit may calculate the relative cyclic shift by applying an IFFT operation method and the condition in which the channel gain values are equivalent to each other in a maximum-likelihood decision rule for the absolute cyclic shift.

Here, the operation unit may calculate the channel gain estimate by multiplying the signal sequence of a symbol by a complex conjugate sequence before the cyclic shift of the symbol in the bootstrap signal.

Here, for multiple successive symbols in the bootstrap signal, the operation unit may correct the channel gain estimates of the symbols in order from the first symbol to the last symbol and again correct the channel gain estimates of the symbols in reverse order from the last symbol to the first symbol.

Here, the operation unit may correct the channel gain estimate of an N-th symbol (N being an integer that is equal to or greater than 2) using the average of the channel gain estimate of the N-th symbol and the channel gain estimate of an N−1-th symbol, among the multiple successive symbols in the bootstrap signal.

Here, the operation unit may compensate for the phase difference of the channel gain estimate of the N−1-th symbol by multiplying the relative cyclic shift of the N-th symbol by the channel gain estimate of the N−1-th symbol, among the two successive symbols.

Here, the operation unit may compensate for the phase difference of the channel gain estimate of the N-th symbol by multiplying the channel gain estimate of the N-th symbol, the accuracy of which is improved, by the relative cyclic shift that was used to compensate for the phase difference of the N−1-th symbol.

Here, the operation unit may correct the channel gain estimate of the N−1-th symbol using the average of the channel gain estimate of the N-th symbol, of which the phase difference is compensated for, and the channel gain estimate of the N−1-th symbol, of which the phase difference is compensated for.

Also, in order to accomplish the above objects, a method for decoding a bootstrap signal, in which an apparatus for decoding a bootstrap signal is used, according to an embodiment of the present invention includes calculating the relative cyclic shift and the channel gain estimate of a received bootstrap signal; correcting the channel gain estimate using the relative cyclic shift; and decoding the bootstrap signal using the corrected channel gain estimate.

Here, calculating the relative cyclic shift and the channel gain estimate may be configured to calculate the relative cyclic shift using the absolute cyclic shifts of two successive symbols in the bootstrap signal.

Here, calculating the relative cyclic shift and the channel gain estimate may be configured to calculate the relative cyclic shift depending on the condition in which the channel gain values of the two successive symbols in the bootstrap signal are equivalent to each other.

Here, calculating the relative cyclic shift and the channel gain estimate may be configured to calculate the relative cyclic shift by applying an IFFT operation method and the condition in which the channel gain values are equivalent to each other in a maximum-likelihood decision rule for the absolute cyclic shift.

Here, calculating the relative cyclic shift and the channel gain estimate may be configured to calculate the channel gain estimate by multiplying the signal sequence of a symbol by a complex conjugate sequence before the cyclic shift of the symbol in the bootstrap signal.

Here, correcting the channel gain estimate may be configured to correct the channel gain estimates of symbols in order from the first symbol to the last symbol and to again correct the channel gain estimates of the symbols in reverse order from the last symbol to the first symbol for the multiple successive symbols in the bootstrap signal.

Here, correcting the channel gain estimate may be configured to correct the channel gain estimate of an N-th symbol (N being an integer that is equal to or greater than 2) using the average of the channel gain estimate of the N-th symbol and the channel gain estimate of an N−1-th symbol, among the multiple successive symbols in the bootstrap signal.

Here, correcting the channel gain estimate may be configured to compensate for the phase difference of the channel gain estimate of the N−1-th symbol by multiplying the relative cyclic shift of the N-th symbol by the channel gain estimate of the N−1-th symbol, among the two successive symbols.

Here, correcting the channel gain estimate may be configured to compensate for the phase difference of the channel gain estimate of the N-th symbol by multiplying the channel gain estimate of the N-th symbol, the accuracy of which is improved, by the relative cyclic shift that was used to compensate for the phase difference of the N−1-th symbol.

Here, correcting the channel gain estimate may be configured to correct the channel gain estimate of the N−1-th symbol using the average of the channel gain estimate of the N-th symbol, of which the phase difference is compensated for, and the channel gain estimate of the N−1-th symbol, of which the phase difference is compensated for.

Advantageous Effects

The present inventions may provide maximum-likelihood decoding in order to decode a bootstrap signal.

Also, the present invention may improve the accuracy of a channel gain estimate, which is necessary for maximum-likelihood decoding.

Also, the present invention may enable accurate decoding of a bootstrap signal by performing iterative maximum-likelihood decoding using a more accurate channel gain estimate.

BEST MODE

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

Figure 1:
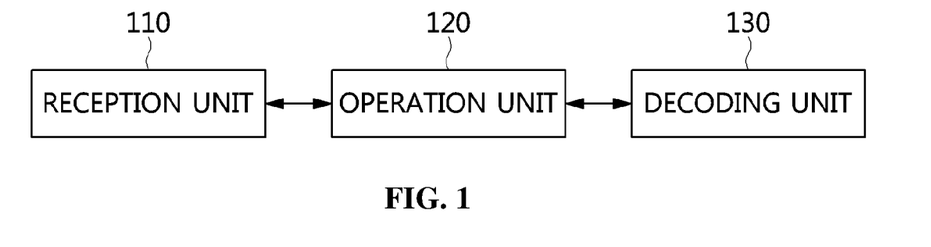
FIG. 1 is a block diagram that shows an apparatus for decoding a bootstrap signal according to an embodiment of the present invention.

FIG. 1 is a block diagram that shows an apparatus for decoding a bootstrap signal according to an embodiment of the present invention.

Referring to FIG. 1, the apparatus for decoding a bootstrap signal according to an embodiment of the present invention may include a reception unit 110, an operation unit 120, and a decoding unit 130.

The reception unit 110 may receive a broadcast signal.

Here, the reception unit 110 may acquire a bootstrap signal, which is the initial frame, from the broadcast signal.

The operation unit 120 may calculate the relative cyclic shift and the channel gain estimate of the received bootstrap signal.

Here, the operation unit 120 may correct the channel gain estimate using the relative cyclic shift.

Here, the operation unit 120 may receive a bootstrap signal from a broadcast signal reception device that originally receives the signal. In this case, the apparatus for decoding a bootstrap signal may not include the reception unit 110.

That is, the apparatus for receiving a bootstrap signal according to an embodiment of the present invention may directly receive a broadcast signal and acquire a bootstrap signal therefrom, or the apparatus may be connected with a broadcast signal reception device for receiving broadcast signals, or may be included in the broadcast signal reception device as a module thereof.

In the apparatus for receiving a bootstrap signal according to an embodiment of the present invention, if a broadcast signal transmission device and a broadcast signal reception device are perfectly synchronized with each other, the received signal in the frequency domain may be represented as shown in Equation 1.

$$R_n(k) = H_n(k)S_n(k)e^{j\frac{2\pi k M_n}{N_{FFT}}} + W_n(k) \quad \text{[Equation 1]}$$
$$= H_{e,n}(k)S_n(k) + W_n(k)$$

Here, $H_n(k)$ denotes the channel gain of the k-th subcarrier for the n-th symbol, $S_n(k)$ denotes a sequence acquired by multiplying a Zadoff-Chu sequence for the n-th symbol by a pseudo-noise sequence, and $W_n(k)$ denotes the Additive White Gaussian Noise (AWGN) of the k-th subcarrier for the n-th symbol.

$H_{e,n}(k)$ may be $$H_n(k)e^{j\frac{2\pi k M_n}{N_{FFT}}},$$

and $N_{FFT}$ may be the size of FFT.

Here, when the broadcast signal reception device has complete information about a channel, a maximum likelihood decision rule for an absolute cyclic shift M may be represented as shown in Equation 2.

$$M_n = \arg\min_{\tilde{m}_n \in x_a} \sum_{k=0}^{N_{FFT}-1} \left| R_n(k) - H_n(k)S_n(k)e^{j\frac{2\pi k \tilde{m}_n}{N_{FFT}}} \right|^2 \quad \text{[Equation 2]}$$

Here, $x_a$ may represent all possible absolute cyclic shifts.

Here, in a static or slow fading channel, the symbol duration of a bootstrap signal may be shorter than that of a single data OFDM symbol.

Here, the channel gain values of two successive symbols may be consistent.

Accordingly, the channel gain values of the two successive symbols and the absolute cyclic shift may be represented as shown in Equation 3.

$$H_n(k) \approx H_{n-1}(k)$$

$$M_n = M_{n-1} + \tilde{M}_n \quad \text{[Equation 3]}$$

Here, the operation unit 120 may calculate a relative cyclic shift using the absolute cyclic shifts of two successive symbols in the bootstrap signal, as shown in Equation 3.

That is, the operation unit 120 may calculate the relative cyclic shift depending on the condition in which the channel gain values of the two successive symbols in the bootstrap signal are equivalent to each other.

Here, the ML decision rule for the relative cyclic shift may be derived using Equation 3, as shown in Equation 4.

$$M_n = \arg\min_{\tilde{m}_n \in x_r} \sum_{k=0}^{N_{FFT}-1} \left| R_n(k) - H_{e,n-1}(k)S_n(k)e^{j\frac{2\pi k \tilde{m}_n}{N_{FFT}}} \right|^2 \quad \text{[Equation 4]}$$

-continued
$$= \arg\max_{\tilde{m}_n \in x_r} \text{Re}\left\{ \sum_{k=0}^{N_{FFT}-1} \left( R_n^*(k)H_{e,n-1}(k)S_n(k)e^{j\frac{2\pi k \tilde{m}_n}{N_{FFT}}} \right) \right\}$$
$$= \arg\max_{\tilde{m}_n \in x_r} \text{Re}\{IFFT(R_n^*(k)H_{e,n-1}(k)S_n(k))\}$$

In Equation 4, maximum-likelihood decoding may be performed through an IFFT operation.

Here, $x_r$ may be all possible relative cyclic shifts, and IFFT$\{\cdot\}$ may represent an IFFT operation.

That is, the operation unit 120 may calculate the relative cyclic shifts of multiple symbols using Equation 4.

Here, the operation unit 120 may calculate the relative cyclic shift by applying the IFFT operation method and the condition in which the channel gain values are equivalent to each other in the ML decision rule for the absolute cyclic shift.

For example, the operation unit 120 may calculate the channel gain estimate $\tilde{H}_{e,n-1}(k)$ by multiplying the signal sequence of the symbol by a complex conjugate sequence before the cyclic shift of the symbol in the bootstrap signal, as shown in Equation 5.

$$R_0(k)S_n^*(k) = H_0(k)e^{j\frac{2\pi n M_0}{N_{FFT}}} + W_0(k)S_0^*(k) = \tilde{H}_{e,0}(k) \quad \text{[Equation 5]}$$

Because the detection performance of the ML decision rule is based on the result of channel gain estimation, excellent detection performance may be realized when a channel gain estimate is very reliable.

Here, in order to improve the reliability of a channel gain estimate, the operation unit 120 averages the channel gain estimate of a previous symbol and the channel gain estimate of a current symbol using a forward decoding algorithm, thereby improving accuracy.

Here, the operation unit 120 may calculate the first relative cyclic shift $\tilde{M}_1$ using Equation 4.

Here, the operation unit 120 may calculate the channel gain estimates of the multiple successive symbols using Equation 5.

For example, the operation unit 120 may calculate the channel gain estimates of symbol 0 and symbol 1 using Equation 5.

Also, the operation unit 120 may correct the channel gain estimate of the N-th symbol (N being an integer that is equal to or greater than 2) using the average of the channel gain estimate of the N-th symbol and the channel gain estimate of the N−1-th symbol, among the multiple successive symbols in the bootstrap signal.

For example, in order to calculate the second relative cyclic shift, the operation unit 120 may estimate the channel of symbol 1 and then calculate the average of the estimated channel of symbol 1 and the channel gain estimate of symbol 0, which is $\tilde{H}_{e,0}(k)$.

Here, because the symbol value before the cyclic shift is used for the channel gain estimate, the phase rotation by the cyclic shift of the symbol may be reflected to the estimated channel value. Accordingly, a phase difference corresponding to the relative cyclic shift is generated between the channel gain estimates for two successive symbols, and it is required to compensate for the phase difference when the channel gain estimates are averaged.

That is, the operation unit 120 multiplies the relative cyclic shift of the N-th symbol by the channel gain estimate of the N−1-th symbol, among the two successive symbols, thereby compensating for the phase difference of the channel gain estimate of the N−1-th symbol.

For example, in order to improve the reliability of the channel gain estimate of symbol 1, the operation unit 120 calculates the average of the channel gain estimate $\tilde{H}_{e,1}(k)$, acquired using the received signal corresponding to symbol 1, and the channel gain estimate $$\tilde{H}_{e,0}(k)e^{j\frac{2\pi k \tilde{M}_1}{N_{FFT}}},$$

acquired by rotating the phase of the channel gain estimate of symbol 0, $\tilde{H}_{e,0}(k)$, by the relative cyclic shift $\tilde{M}_1$, thereby calculating a more accurate channel gain estimate of symbol 1, as shown in Equation 6.

$$\tilde{H}'_{e,1}(k) = \frac{1}{2}\left(\tilde{H}_{e,0}(k)e^{j\frac{2\pi k \tilde{M}_1}{N_{FFT}}} + \tilde{H}_{e,1}(k)\right) \quad \text{[Equation 6]}$$

Also, in order to calculate the third relative cyclic shift, the operation unit 120 may estimate the channel gain estimate of symbol 2 and then calculate the average of the channel gain estimate of symbol 2 and the more accurate channel gain estimate $\tilde{H}_{e,1}'(k)$, which is calculated above using the average.

Here, because the phases of the channel gain estimates differ from each other, the operation unit 120 may correct $\tilde{H}_{e,1}'(k)$ using the second relative cyclic shift $\tilde{M}_2$, as shown in Equation 7.

$$\tilde{H}'_{e,2}(k) = \frac{1}{2}\left(\tilde{H}'_{e,1}(k)e^{j\frac{2\pi k \tilde{M}_2}{N_{FFT}}} + \tilde{H}_{e,2}(k)\right) \quad \text{[Equation 7]}$$

Also, the operation unit 120 may execute a backward decoding algorithm, in which averages are again calculated in the order reverse to the order in which the averages are calculated using the above-described forward decoding algorithm, in order to improve channel gain estimation performance. The ML decision rule for backward decoding may be represented as shown in Equation 8.

That is, the operation unit 120 multiplies the channel gain estimate of the N-th symbol, the accuracy of which is improved, by the relative cyclic shift that was used to compensate for the phase difference of the N−1-th symbol, thereby compensating for the phase difference of the channel gain estimate of the N-th symbol.

Here, the operation unit 120 may correct the channel gain estimate of the N−1-th symbol using the average of the channel gain estimate of the N-th symbol, of which the phase difference is compensated for, and the channel gain estimate of the N−1-th symbol, of which the phase difference is compensated for.

$$\tilde{M}_{n+1} = \arg\max_{\tilde{M}_{n+1} \in x_r} \text{Re}\{IFFT\{R_n(k)H^*_{e,n+1}(k)S^*_n(k)\}\} \quad \text{[Equation 8]}$$

For example, in order to calculate the third relative cyclic shift having improved accuracy, the operation unit 120 may estimate the channel gain estimate of symbol 3 and then calculate the average of the channel gain estimate of symbol 3 and the channel gain estimate of symbol 2, the accuracy of which is improved, $\tilde{H}_{e,2}'(k)$, as shown in Equation 9.

Here, because the phases of the channel gain estimates differ from each other, the operation unit 120 may correct $\tilde{H}_{e,2}'(k)$ using the third relative cyclic shift $\tilde{M}_3$, as shown in Equation 9.

$$\tilde{H}'_{e,3}(k) = \frac{1}{2}\left(\tilde{H}'_{e,2}(k)e^{j\frac{2\pi k \tilde{M}_3}{N_{FFT}}} + \tilde{H}_{e,3}(k)\right) \quad \text{[Equation 9]}$$

Also, in order to calculate the second relative cyclic shift having improved accuracy using a backward decoding algorithm, the operation unit 120 may calculate the average of the channel gain estimate of symbol 3, $\tilde{H}_{e,3}'(k)$, which is calculated above using the average, and the channel gain estimate of symbol 2, $\tilde{H}_{e,2}(k)$, as shown in Equation 10.

Here, because the phases of the channel gain estimates differ from each other, the operation unit 120 may correct $\tilde{H}_{e,3}'(k)$ using $\tilde{M}_3$, which is the recently calculated third relative cyclic shift, as shown in Equation 10.

$$\tilde{H}''_{e,2}(k) = \frac{1}{2}\left(\tilde{H}'_{e,3}(k)e^{j\frac{2\pi k(-\tilde{M}_3)}{N_{FFT}}} + \tilde{H}_{e,2}(k)\right) \quad \text{[Equation 10]}$$

Also, in order to calculate the first relative cyclic shift having improved accuracy, the operation unit 120 may calculate the average of the channel gain estimate of symbol 2, $\tilde{H}_{e,2}''(k)$, which is calculated above using the average, and the channel gain estimate of symbol 1, $\tilde{H}_{e,1}(k)$, as shown in Equation 11.

Here, because the phases of the channel gain estimates differ from each other, the operation unit 120 may correct $\tilde{H}_{e,2}''(k)$ using $\tilde{M}_2$, which is the recently calculated second relative cyclic shift, as shown in Equation 11.

$$\tilde{H}''_{e,1}(k) = \frac{1}{2}\left(\tilde{H}''_{e,2}(k)e^{j\frac{2\pi k(-\tilde{M}_2)}{N_{FFT}}} + \tilde{H}_{e,1}(k)\right) \quad \text{[Equation 11]}$$

That is, for the multiple successive symbols in a bootstrap signal, the operation unit 130 may correct the channel gain estimates of the symbols in order from the first symbol to the last symbol, and may again correct the channel gain estimates in reverse order from the last symbol to the first symbol, as shown in Equations 6 to 11.

Here, the operation unit 130 repeatedly executes the forward decoding algorithm and the backward decoding algorithm, whereby performance in detection of the channel gain estimates may be further improved.

The decoding unit 130 may decode a bootstrap signal using corrected channel gain estimates.

That is, the decoding unit 130 performs decoding operations based on the ML decision rule shown in Equations 4 and 8 and selects the channel gain estimates calculated in Equations 6, 7 and 9 to 11, thereby decoding the bootstrap signal.

Figure 2:
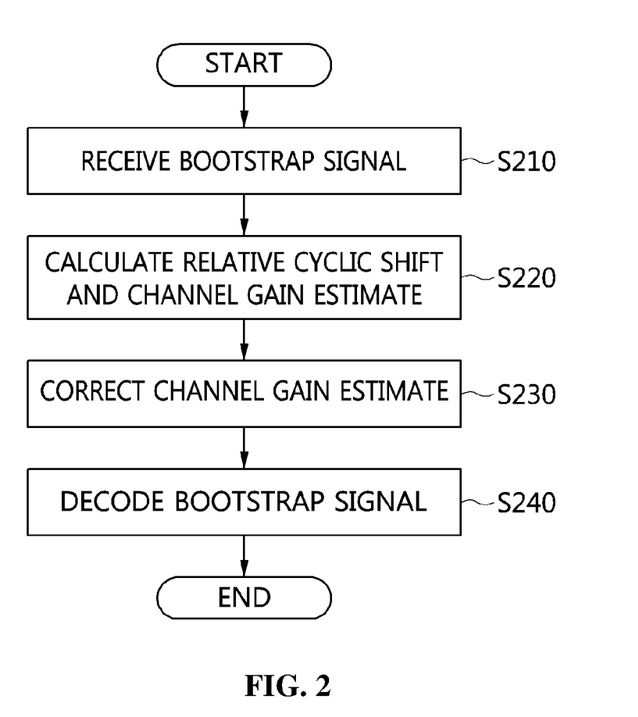
FIG. 2 is a flowchart that shows a method for decoding a bootstrap signal according to an embodiment of the present invention.
Figure 3:
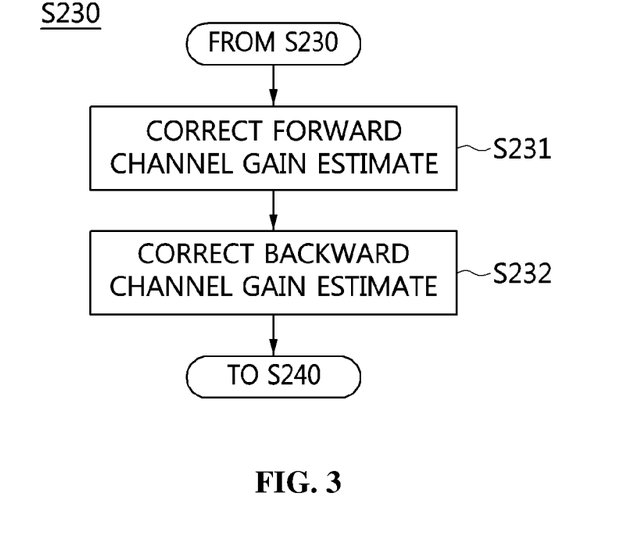
FIG. 3 is a flowchart that specifically shows an example of the step of correcting a channel gain estimate, illustrated in FIG. 2.

FIG. 2 is a flowchart that shows a method for decoding a bootstrap signal according to an embodiment of the present invention. FIG. 3 is a flowchart that specifically shows the step of correcting the channel gain estimate, illustrated in FIG. 2.

Referring to FIG. 2, in the method for decoding a bootstrap signal according to an embodiment of the present invention, first, a bootstrap signal may be received at step S210.

That is, at step S210, a broadcast signal may be received.

Here, at step S210, a bootstrap signal, which is the initial frame, may be acquired from the broadcast signal.

Here, at step S210, alternatively, a bootstrap signal, received by a broadcast signal reception device, may be input.

Also, in the method for decoding a bootstrap signal according to an embodiment of the present invention, a relative cyclic shift and a channel gain estimate may be calculated at step S220.

That is, at step S220, the relative cyclic shift and the channel gain estimate of the received bootstrap signal may be calculated.

Here, at step S220, the relative cyclic shift may be calculated using the absolute cyclic shifts of two successive symbols in the bootstrap signal, as shown in Equation 3.

Here, at step S220, the relative cyclic shift may be calculated depending on the condition in which the channel gain values of two successive symbols in the bootstrap signal are equivalent to each other.

Also, at step S220, the relative cyclic shifts of the multiple symbols may be calculated using Equation 4.

Here, at step S220, the relative cyclic shift may be calculated by applying the IFFT operation method and the condition in which the channel gain values are equivalent to each other in the ML decision rule for the absolute cyclic shift.

Here, the operation unit 120 may calculate the channel gain estimates of the multiple successive symbols using Equation 5.

Also, in the method for decoding a bootstrap signal according to an embodiment of the present invention, the channel gain estimate may be corrected at step S230.

That is, at step S230, the channel gain estimate may be corrected using the relative cyclic shift.

Here, at step S230, a forward channel gain estimate may be corrected at step S231.

That is, at step S231, in order to improve the reliability of the channel gain estimate, the channel gain estimate of a previous symbol and that of a current symbol are averaged using a forward decoding algorithm, whereby accuracy may be improved.

Here, at step S231, the channel gain estimate of the N-th symbol (N being an integer that is equal to or greater than 2) may be corrected using the average of the channel gain estimate of the N-th symbol and the channel gain estimate of the N−1-th symbol, among the multiple successive symbols in the bootstrap signal.

Here, because the symbol value before the cyclic shift is used for the channel gain estimate, the phase rotation by the cyclic shift of the symbol may be reflected to the estimated channel value. Accordingly, a phase difference corresponding to the relative cyclic shift is generated between the channel gain estimates for two successive symbols, and it is required to compensate for the phase difference when the channel gain estimates are averaged.

That is, at step S231, the phase difference of the channel gain estimate of the N−1-th symbol may be compensated for by multiplying the relative cyclic shift of the N-th symbol by the channel gain estimate of the N−1-th symbol in the two successive symbols.

Also, at step S230, a backward channel gain estimate may be corrected at step S232.

That is, at step S232, a backward decoding algorithm, in which averages are again calculated in the order reverse to the order in which the averages are calculated using the above-described forward decoding algorithm, is performed in order to improve the channel gain estimation performance.

Here, at step S232, the channel gain estimate of the N-th symbol, the accuracy of which is improved, is multiplied by the relative cyclic shift that was used to compensate for the phase difference of the N−1-th symbol, whereby the phase difference of the channel gain estimate of the N-th symbol may be compensated for.

Here, at step S232, the channel gain estimate of the N−1-th symbol may be corrected using the average of the channel gain estimate of the N-th symbol, of which the phase difference is compensated for, and the channel gain estimate of the N−1-th symbol, of which the phase difference is compensated for.

Here, at step S232, for the multiple successive symbols of the bootstrap signal, the channel gain estimates of the first to last symbols are sequentially corrected, and the channel gain estimates may be corrected again in reverse order from the last symbol to the first symbol, as shown in Equations 6 to 11.

Also, at step S230, steps S231 and 232 may be repeatedly performed.

That is, at step S230, performance in detection of the channel gain estimates may be further improved by repeatedly executing the forward decoding algorithm at step S231 and the backward decoding algorithm at step S232.

Also, in the method for decoding a bootstrap signal according to an embodiment of the present invention, the bootstrap signal may be decoded at step S240.

That is, at step S240, the bootstrap signal may be decoded using the corrected channel gain estimates.

Here, at step S240, the decoding operations based on the ML decision rule, shown in Equations 4 and 8, are performed, and the channel gain estimates, calculated in Equations 6, 7 and 9 to 11, are selected, whereby the bootstrap signal may be decoded.

Figure 4:
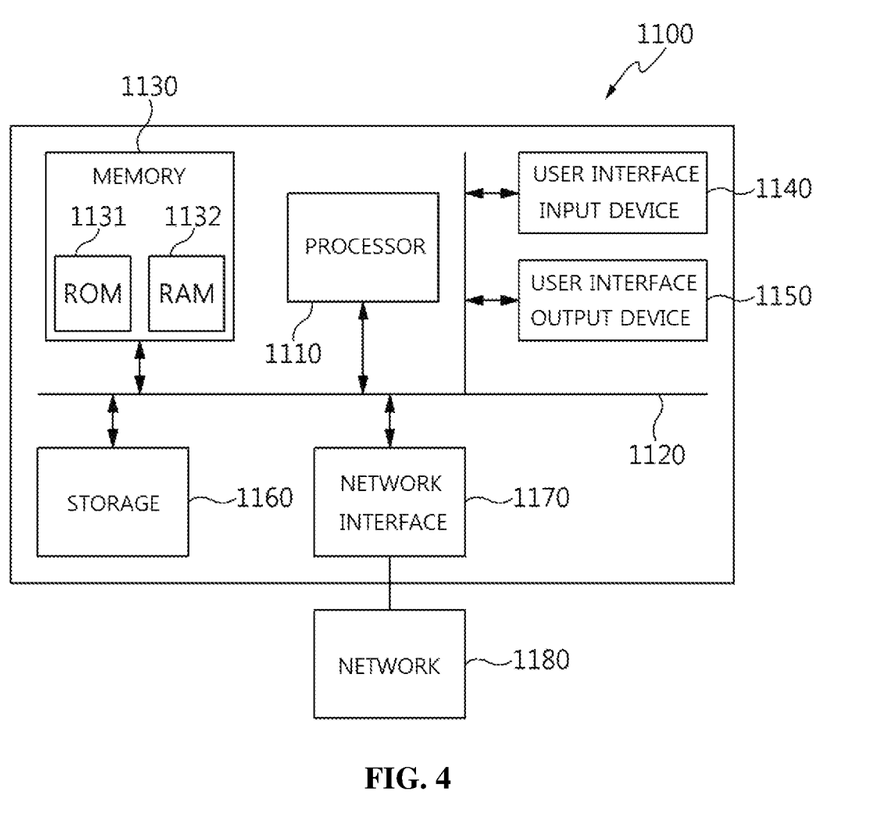
FIG. 4 is a block diagram that shows a computer system according to an embodiment of the present invention.

FIG. 4 is a block diagram that shows a computer system according to an embodiment of the present invention.

Referring to FIG. 4, the apparatus for decoding a bootstrap signal according to an embodiment of the present invention may be implemented in a computer system 1100 including a computer-readable recording medium. As illustrated in FIG. 4, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected with a network 1180. The processor may be a central processing unit or a semiconductor device for executing processing instructions stored in the memory 1130 or the storage 1160. The memory 1130 and the storage 1160 may be various types of volatile or nonvolatile storage media. For example, the memory may include ROM 1131 or RAM 1132.

As described above, the apparatus and method for decoding a bootstrap signal according to the present invention are not limitedly applied to the configurations and operations of the above-described embodiments, but all or some of the

| Description of Reference numerals | |
|---|---|
| 110: reception unit | 120: operation unit |
| 130: decoding unit | |
| 1100: computer system | 1110: processor |
| 1120: bus | 1130: memory |
| 1131: ROM | 1132: RAM |
| 1140: user interface input device | 1150: user interface output device |
| 1160: storage | 1170: network interface |
| 1180: network | |

The invention claimed is:

1. An apparatus for decoding a bootstrap signal, comprising a processor and a memory storing at least one instruction to be executed by the processor, wherein the at least one instruction is configured to:

calculate a relative cyclic shift and a channel gain estimate of a received bootstrap signal and correcting the channel gain estimate using the relative cyclic shift; and decode the bootstrap signal using the corrected channel gain estimate, wherein the relative cyclic shift is calculated by applying an IFFT operation in a maximum-likelihood decision rule for the relative cyclic shift, wherein the channel gain estimate is corrected by averaging multiple channel gain estimates for multiple symbols, wherein at least one phase difference is compensated in the averaging multiple channel gain estimates by using the relative cyclic shift calculated by applying the IFFT operation in the maximum-likelihood decision rule, and wherein the channel gain estimate corrected by averaging the multiple channel gain estimates is used in an IFFT operation for calculating a relative cycle shift.

2. The apparatus of claim 1, wherein the relative cyclic shift is calculated by using absolute cyclic shifts of two successive symbols in the bootstrap signal.

3. The apparatus of claim 2, wherein the relative cyclic shift is calculated depending on a condition in which channel gain values of the two successive symbols in the bootstrap signal are equivalent to each other.

4. The apparatus of claim 3, wherein the relative cyclic shift is calculated by applying the IFFT operation method and the condition in which the channel gain values are equivalent to each other in a maximum-likelihood decision rule for the absolute cyclic shift.

5. The apparatus of claim 1, wherein the channel gain estimate is calculated by multiplying a signal sequence value of a symbol by a complex conjugate sequence value before cyclic shift of the symbol in the bootstrap signal.

6. The apparatus of claim 5, wherein the channel gain estimates of symbols are corrected in order from a first symbol to a last symbol and are corrected again in reverse order from the last symbol to the first symbol for the multiple successive symbols in the bootstrap signal.

7. The apparatus of claim 6, wherein the channel gain estimate of an N-th symbol (N being an integer that is equal to or greater than 2) is corrected using an average of the channel gain estimate of the N-th symbol and a channel gain estimate of an N−1-th symbol, among the multiple successive symbols in the bootstrap signal.

8. The apparatus of claim 7, wherein the a phase difference of the channel gain estimate of the N−1-th symbol is compensated by multiplying a relative cyclic shift of the N-th symbol by the channel gain estimate of the N−1-th symbol, among the two successive symbols.

9. The apparatus of claim 8, wherein the phase difference of the channel gain estimate of the N-th symbol is compensated by multiplying the channel gain estimate of the N-th symbol, an accuracy of which is improved, by the relative cyclic shift that was used to compensate for the phase difference of the N−1-th symbol.

10. The apparatus of claim 9, wherein the channel gain estimate of the N−1-th symbol is corrected using an average of the channel gain estimate of the N-th symbol, of which the phase difference is compensated for, and the channel gain estimate of the N−1-th symbol, of which the phase difference is compensated for.

11. A method for decoding a bootstrap signal, in which an apparatus for decoding a bootstrap signal is used, comprising:

calculating a relative cyclic shift and a channel gain estimate of a received bootstrap signal;

correcting the channel gain estimate using the relative cyclic shift; and decoding the bootstrap signal using the corrected channel gain estimate, wherein the relative cyclic shift is calculated by applying an IFFT operation in a maximum-likelihood decision rule for the relative cyclic shift, wherein the channel gain estimate is corrected by averaging multiple channel gain estimates for multiple symbols, wherein at least one phase difference is compensated in the averaging multiple channel gain estimates by using the relative cyclic shift calculated by applying the IFFT operation in the maximum-likelihood decision rule, and wherein the channel gain estimate corrected by averaging the multiple channel gain estimates is used in an IFFT operation for calculating a relative cycle shift.

12. The method of claim 11, wherein calculating the relative cyclic shift and the channel gain estimate is configured to calculate the relative cyclic shift using absolute cyclic shifts of two successive symbols in the bootstrap signal.

13. The method of claim 12, wherein calculating the relative cyclic shift and the channel gain estimate is configured to calculate the relative cyclic shift depending on a condition in which channel gain values of the two successive symbols in the bootstrap signal are equivalent to each other.

14. The method of claim 13, wherein calculating the relative cyclic shift and the channel gain estimate is configured to calculate the relative cyclic shift by applying the IFFT operation and the condition in which the channel gain values are equivalent to each other in a maximum-likelihood decision rule for the absolute cyclic shift.

15. The method of claim 11, wherein calculating the relative cyclic shift and the channel gain estimate is configured to calculate the channel gain estimate by multiplying a signal sequence value of a symbol by a complex conjugate sequence value before cyclic shift of the symbol in the bootstrap signal.

16. The method of claim 15, wherein correcting the channel gain estimate is configured to correct channel gain estimates of symbols in order from a first symbol to a last symbol and to again correct the channel gain estimates of the symbols in reverse order from the last symbol to the first symbol for the multiple successive symbols in the bootstrap signal.

17. The method of claim 16, wherein correcting the channel gain estimate is configured to correct a channel gain estimate of an N-th symbol (N being an integer that is equal to or greater than 2) using an average of the channel gain estimate of the N-th symbol and a channel gain estimate of an N−1-th symbol, among the multiple successive symbols in the bootstrap signal.

18. The method of claim 17, wherein correcting the channel gain estimate is configured to compensate for a phase difference of the channel gain estimate of the N−1-th symbol by multiplying a relative cyclic shift of the N-th symbol by the channel gain estimate of the N−1-th symbol, among the two successive symbols.

19. The method of claim 18, wherein correcting the channel gain estimate is configured to compensate for a phase difference of the channel gain estimate of the N-th symbol by multiplying the channel gain estimate of the N-th symbol, an accuracy of which is improved, by the relative cyclic shift that was used to compensate for the phase difference of the N−1-th symbol.

20. The method of claim 19, wherein correcting the channel gain estimate is configured to correct the channel gain estimate of the N−1-th symbol using an average of the channel gain estimate of the N-th symbol, of which the phase difference is compensated for, and the channel gain estimate of the N−1-th symbol, of which the phase difference is compensated for.

\* \* \* \* \*